US012668156B2

(12) United States Patent
Omi et al.

(10) Patent No.: US 12,668,156 B2
(45) Date of Patent: Jun. 30, 2026

(54) POSITION DISPLACEMENT DEVICE, STORAGE MEDIUM STORING COMPUTER PROGRAM FOR POSITION DISPLACEMENT AND POSITION DISPLACEMENT METHOD

(71) Applicants: TOYOTA JIDOSHA KABUSHIKI KAISHA, Toyota (JP); AISIN CORPORATION, Kariya (JP)

(72) Inventors: Takuhiro Omi, Anjo (JP); Udara Eshan Manawadu, Tokyo-to (JP); Hiroshi Morimoto, Tokyo-to (JP); Kenta Yamada, Tokyo-to (JP); Kenichiroh Hara, Yokohama (JP)

(73) Assignees: TOYOTA JIDOSHA KABUSHIKI KAISHA, Toyota (JP); AISIN CORPORATION, Kariya (JP)

( * ) Notice: Subject to any disclaimer, the term of this patent is extended or adjusted under 35 U.S.C. 154(b) by 258 days.

(21) Appl. No.: 18/226,517

(22) Filed: Jul. 26, 2023

(65) Prior Publication Data

US 2024/0067054 A1 Feb. 29, 2024

(30) Foreign Application Priority Data

Aug. 29, 2022 (JP) ................................. 2022-135843

(51) Int. Cl.
*B60N 2/02* (2006.01)
*B60N 2/22* (2006.01)
(Continued)

(52) U.S. Cl.
CPC ......... *B60N 2/0268* (2023.08); *B60N 2/0278* (2023.08); *B60N 2/22* (2013.01);
(Continued)

(58) Field of Classification Search
CPC ...... B60N 2/0268; B60N 2/0278; B60N 2/22; B60N 2210/24; B60N 2/0023;
(Continued)

(56) References Cited

U.S. PATENT DOCUMENTS

| | | | |
|---|---|---|---|
| 6,916,040 B1 * | 7/2005 | Levine | B60N 2/4221 |
| | | | 296/68.1 |
| 11,124,143 B1 * | 9/2021 | Pertsel | B60R 21/02 |
| 2007/0265738 A1 * | 11/2007 | Saito | B60N 2/0279 |
| | | | 701/2 |
| 2017/0334451 A1 | 11/2017 | Asakura et al. | |

(Continued)

FOREIGN PATENT DOCUMENTS

| | | |
|---|---|---|
| CN | 107415959 A | 11/2020 |
| JP | 2018-111392 A | 7/2018 |

(Continued)

*Primary Examiner* — Sihar A Karwan
(74) *Attorney, Agent, or Firm* — Oliff PLC

(57) ABSTRACT

A position displacing device has a processor configured to set a recommendation range of the seat position, capable of displacing the seat position to a manual control position representing the seat position when a driver is operating a vehicle manually within a predetermined time, based on the manual control position, set an intermediate position between the manual control position and an automatic control position set within the recommendation range, and determine whether a level to which the driver is contributing to driving is equal to or below a predetermined reference threshold based on information that describes physical condition of the driver, wherein the seat position is displaced from the automatic control position to the intermediate position when the seat position is at the automatic control position and it is determined that the level to which the driver is contributing to driving is equal to or below the reference threshold.

8 Claims, 6 Drawing Sheets

(51) Int. Cl.

| | |
|---|---|
| *B60W 40/08* | (2012.01) |
| *B60W 50/16* | (2020.01) |
| *B60W 60/00* | (2020.01) |
| *B60W 50/14* | (2020.01) |

(52) U.S. Cl.
CPC ............ *B60W 40/08* (2013.01); *B60W 50/16* (2013.01); *B60W 60/005* (2020.02); *B60W 2050/143* (2013.01); *B60W 2050/146* (2013.01); *B60W 2540/221* (2020.02); *B60W 2540/223* (2020.02)

(58) Field of Classification Search
CPC ...... B60N 2/0277; B60N 2/34; B60N 2/0248; B60W 40/08; B60W 50/16; B60W 60/005; B60W 2050/143; B60W 2050/146; B60W 2540/221; B60W 2540/223
See application file for complete search history.

(56) References Cited

U.S. PATENT DOCUMENTS

| | | | |
|---|---|---|---|
| 2018/0319407 A1* | 11/2018 | Lisseman | G06V 20/597 |
| 2018/0374126 A1* | 12/2018 | Patil | H04W 4/027 |
| 2020/0047770 A1* | 2/2020 | Ozawa | B60N 2/838 |
| 2020/0269726 A1* | 8/2020 | Ohno | B60N 2/06 |
| 2021/0188289 A1* | 6/2021 | Oba | G08G 1/16 |
| 2022/0161813 A1* | 5/2022 | Oba | G08G 1/09675 |
| 2022/0204035 A1* | 6/2022 | MacKenzie | B60W 50/14 |
| 2022/0204042 A1* | 6/2022 | MacKenzie | B60W 60/0051 |

FOREIGN PATENT DOCUMENTS

| | | | |
|---|---|---|---|
| JP | 2018-167623 A | 11/2018 | |
| JP | 2019-142337 A | 8/2019 | |
| JP | 2020-138721 A | 9/2020 | |
| KR | 20200133854 A | 6/2020 | |

* cited by examiner

POSITION DISPLACEMENT DEVICE, STORAGE MEDIUM STORING COMPUTER PROGRAM FOR POSITION DISPLACEMENT AND POSITION DISPLACEMENT METHOD

FIELD

The present disclosure relates to a position displacement device, storage medium storing computer program for position displacement and position displacement method.

BACKGROUND

An automatic control system mounted on a vehicle controls the vehicle at different levels of automatic operation depending on the situation of the vehicle or the judgment of the driver. The automatic control system requires the driver to be in a condition that, in principle, the vehicle can be maneuvered when the vehicle is operated under the so-called automatic operation level 2. In particular, at the time of the manual control represented by the so-called automatic operation level 0, the driver drives the vehicle.

On the other hand, at the time of operation of the vehicle of the so-called autonomous operation level 3, the automatic control system does not require the driver to be in a state in which the driver always operates the vehicle all times. Therefore, the driver can displace the seat position so that, for example, the relaxed posture can be taken during the operation of the vehicle of the autonomous driving level 3.

The automatic control system requests the driver to transfer the primarily controller of driving of the vehicle from the automatic control system to the driver when it is determined that the vehicle cannot be safely operated by the automatic control even when the vehicle of the autonomous operation level 3 is operated (Transition Demand: control transition demand). The driver must begin the manual control of the vehicle in response to the control transition demand. The automatic control system executes the transition of the control so that the transfer of the control of the vehicle to the driver within a predetermined control transition time (e.g., 10 seconds) from the time of generating the control transition demand.

When the automatic control system requests the driver to transfer the vehicle's operation (maneuver) from the automatic control system to the driver while the driver is in a seat position that allows the driver to take a relaxed posture, it may take more than the control transition time to displace the seat position to a position for the driver capable of manually driving the vehicle. In this case, there is a problem that the driver cannot begin the manual control according to the control transition demand.

Japanese Unexamined Patent Publication No. JP 2018-167623 has proposed a vehicle control system that has a driving control unit for switching between an automatic operation and a manual operation of the vehicle, a seat that can be changed to different forms in the automatic operation and in the manual operation, and a seat control unit for controlling the operation of the seat when changing the seat form. In the vehicle control system, a displacement amount of the seat between the form in the manual operation and the form in the automatic operation can be limited in consideration of the time required when switching from the automatic operation to the manual operation.

SUMMARY

At a driver's seat position that allows the driver to take a relaxed posture, the driver may suffer from drowsiness and reduce the level to which the driver is contributing to driving.

Therefore, even when the driver's seat position is changed to a position where the driver can manually control the vehicle within the control transition time from the time when the control transition demand has generated, the driver may not be able to begin the operation of the vehicle depending on the level to which the driver is contributing to driving.

It is an object of the present disclosure to provide a position displacement device capable of displacing the seat position of the driver's seat in a short time to a manually controllable seat position of the vehicle when the level to which the driver is contributing to driving is low.

(1) According to one embodiment, a position displacement device is provided. The position displacement device has a processor configured to control displaceably a seat position of a seat on which a driver is seated, set a recommendation range of the seat position, capable of displacing the seat position to a manual control position representing the seat position when the driver is operating a vehicle manually within a predetermined time, based on the manual control position, set an intermediate position between the manual control position and an automatic control position representing the seat position when the vehicle is controlled at a predetermined automatic driving level set within the recommendation range, and determine whether a level to which the driver is contributing to driving is equal to or below a predetermined reference threshold based on information that describes physical condition of the driver, wherein the seat position is displaced from the automatic control position to the intermediate position when the seat position is at the automatic control position and it is determined that the level to which the driver is contributing to driving is equal to or below the reference threshold.

(2) In the position displacement device of (1), it is preferable that the processor is further configured to displace the seat position to the manual control position when the driver is requested to transfer a primarily controller of driving of the vehicle from an automatic control device to the driver.

(3) In the position displacement device of (1) or (2), it is preferable that the processor is further configured to determine whether there exists a control transition zone where a primarily controller of driving of the vehicle is transferred from the automated control device to the driver within a predetermined distance from a current location of the vehicle, based on the current location of the vehicle, a navigation route of the vehicle, and map information, and displace the seat position from the current position to the manual control position over a time longer than the predetermined time when the control transition zone exists and the seat position is at the automatic control position and time taken for the vehicle to reach the control transition zone is estimated to be longer than the predetermined time.

(4) In the position displacement device of (1) or (2), it is preferable that the processor is further configured to determine whether the seat position requested by the driver is included in the recommendation range, notify the driver through a notification unit that the seat position requested by the driver is not included in the recommendation range when the seat position requested by the driver is not included in the recommendation range, and store in a storage unit that the seat position not included in the recommendation range was requested and set the seat position not included in the recommendation range as the automatic control position, when it is determined that the seat position not included in the recommendation range is requested again by the driver after the driver was notified through the notification unit that the seat position requested by the driver is not included in the recommendation range.

(5) In the position displacement device of (1) to (4), it is preferable that the processor is further configured to impart a stimulus to the driver through a stimulating unit to improve the level to which the driver is contributing to driving when displacing the seat position from the automatic control position to the intermediate position.

(6) According to another embodiment, a storage medium storing a computer program for displacing position is provided. The computer program causes a processor to execute a process, and the process includes controlling displaceably a seat position of a seat on which a driver is seated, setting a recommendation range of the seat position, capable of displacing the seat position to a manual control position representing the seat position when the driver is operating a vehicle manually within a predetermined time, based on the manual control position, setting an intermediate position between the manual control position and an automatic control position representing the seat position when the vehicle is controlled at a predetermined automatic driving level set within the recommendation range; and determining whether a level to which the driver is contributing to driving is equal to or below a predetermined reference threshold based on information that describes physical condition of the driver, wherein the seat position is displaced from the automatic control position to the intermediate position when the seat position is at the automatic control position and it is determined that the level to which the driver is contributing to driving is equal to or below the reference threshold.

(7) According to yet another embodiment of the invention there is provided a method for displacing position. The method for displacing position is carried out by a position displacement device and the method includes controlling displaceably a seat position of a seat on which a driver is seated, setting a recommendation range of the seat position, capable of displacing the seat position to a manual control position representing the seat position when the driver is operating a vehicle manually within a predetermined time, based on the manual control position, setting an intermediate position between the manual control position and an automatic control position representing the seat position when the vehicle is controlled at a predetermined automatic driving level set within the recommendation range; and determining whether a level to which the driver is contributing to driving is equal to or below a predetermined reference threshold based on information that describes physical condition of the driver, wherein the seat position is displaced from the automatic control position to the intermediate position when the seat position is at the automatic control position and it is determined that the level to which the driver is contributing to driving is equal to or below the reference threshold.

Since the disclosed position displacement device can displace the seat position of the driver's seat in a short time to a manually controllable seat position of the vehicle when the level to which the driver is contributing to driving is low, the driver can begin the operation of the vehicle with a margin after the seat position of the driver's seat has displaced to the manual control position.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

DESCRIPTION OF EMBODIMENTS

Figure 1A:
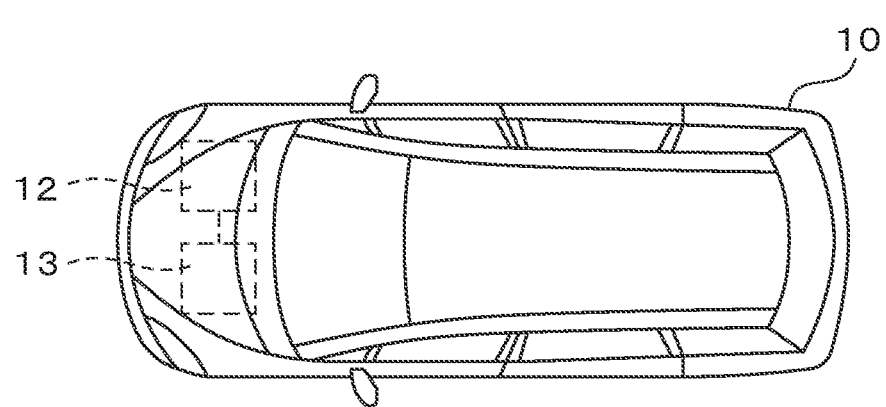
FIG. 1A is a diagram illustrating operation of a position displacement device of the present embodiment and showing a vehicle.
Figure 1B:
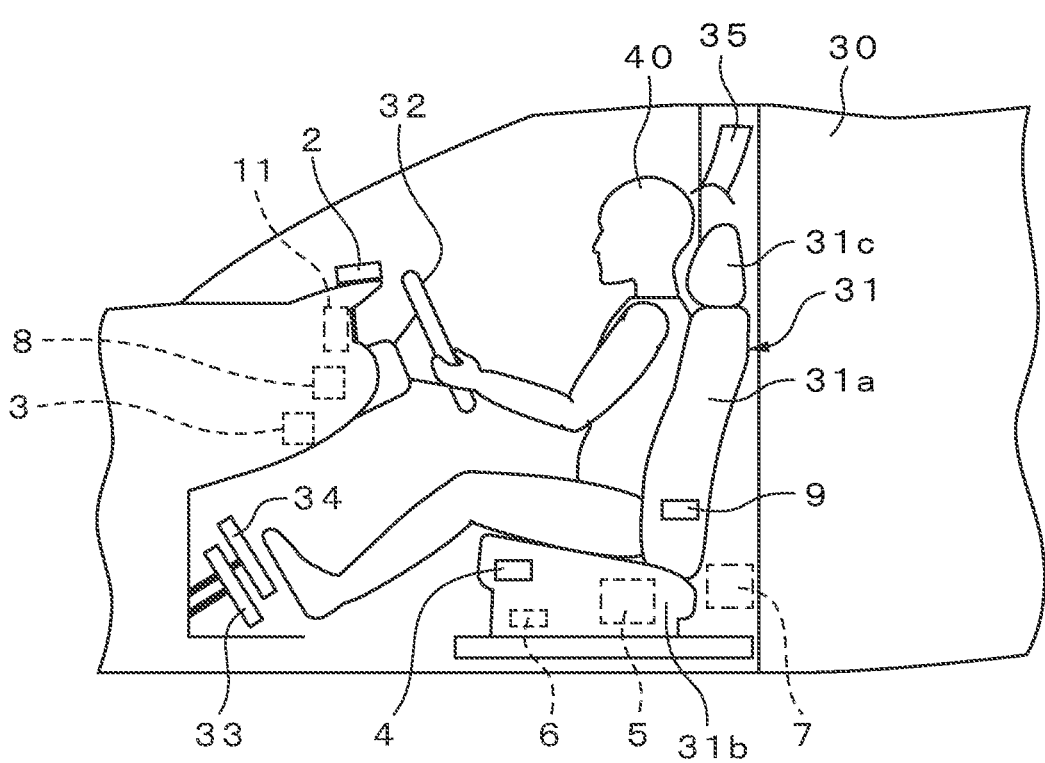
FIG. 1B is a diagram illustrating operation of the position displacement device of the present embodiment and showing a driver's seat in a manual control position.
Figure 2A:
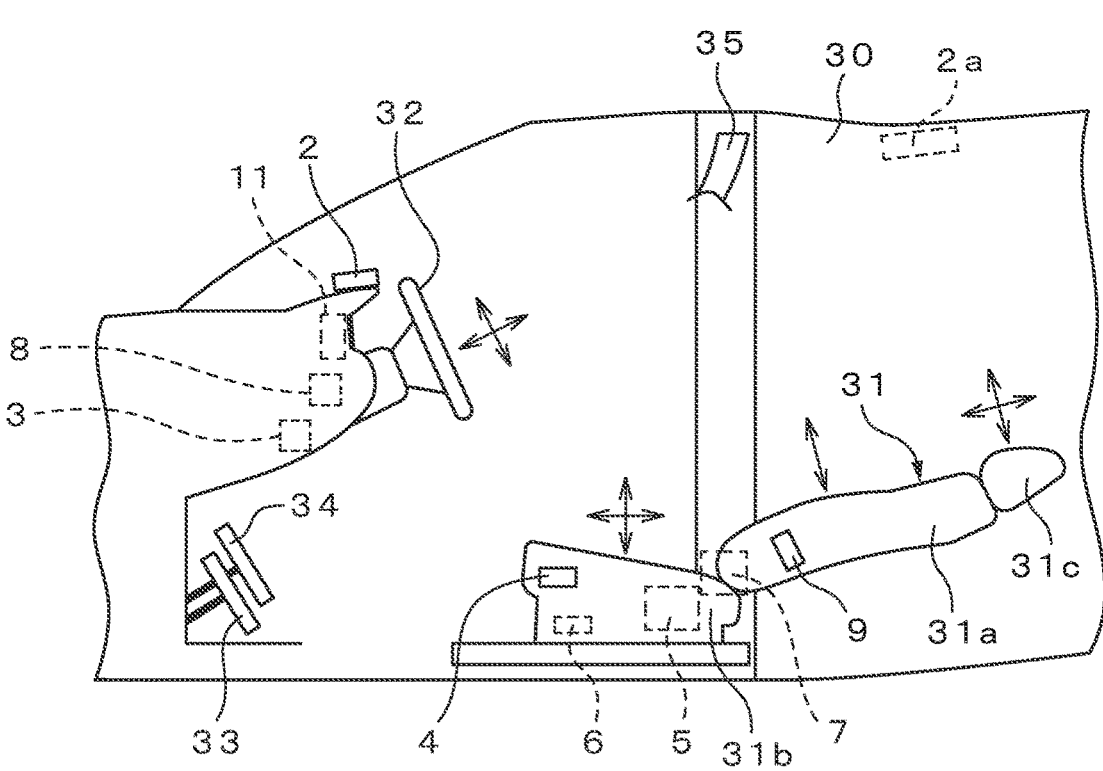
FIG. 2A is a diagram illustrating operation of the position displacement device of the present embodiment and showing a driver's seat in an automatic control position.
Figure 2B:
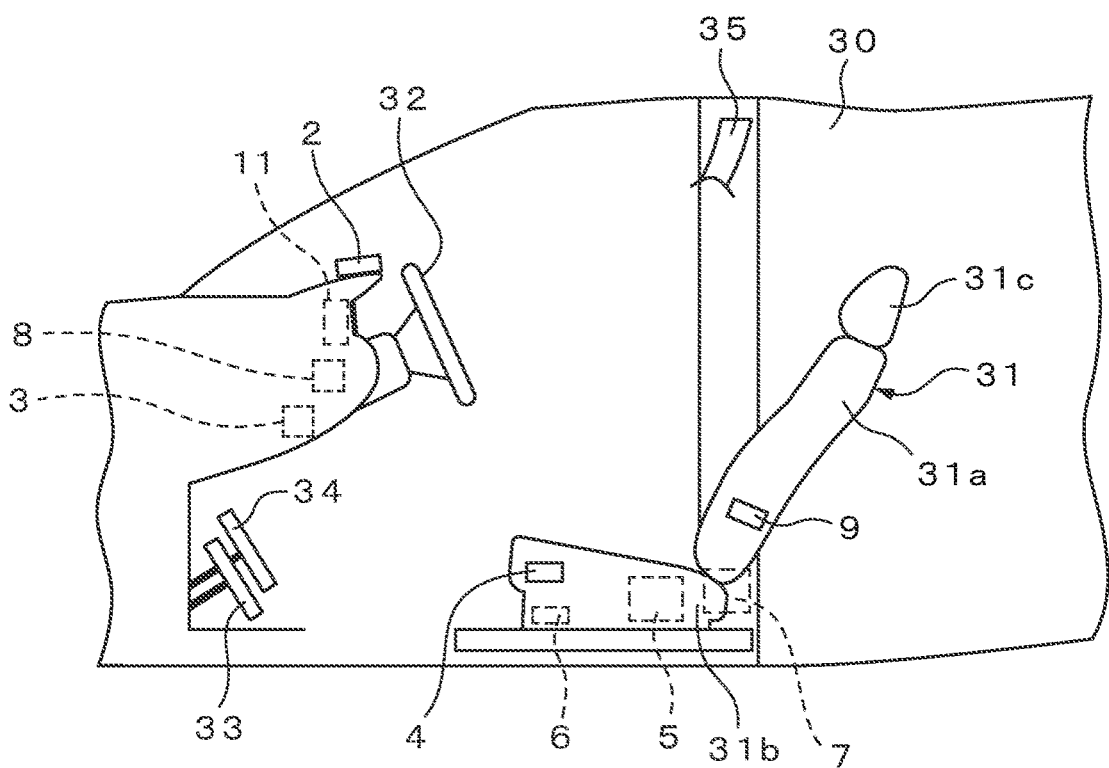
FIG. 2B is a diagram illustrating operation of the position displacement device of the present embodiment and showing a driver's seat in an intermediate position.

FIG. 1A, FIG. 1B, FIG. 2A and FIG. 2B are diagrams illustrating operation of the position displacement device of the present embodiment. FIG. 1A is a diagram showing the vehicle. FIG. 1B is a diagram showing the driver's seat in the manual control position. FIG. 2A is a diagram showing the driver's seat in the automatic control position. FIG. 2B is a diagram showing the driver's seat in the intermediate position.

As shown in FIG. 1A, the vehicle 10 has the automatic control device 12 and the position displacement device 13. In an automatic control mode in which the automatic control device 12 is the primarily controller of the operation (maneuver) of the vehicle 10, the automatic control device 12 drives the vehicle 10. When the automatic control mode has a plurality of automated driving levels, the automatic control device 12 controls the vehicle 10 in response to each of the automated driving levels. In a manual control mode in which the driver 40 is the primarily controller of the operation of the vehicle 10, the automatic control device 12 controls the operation of the vehicle 10 based on the operation of the driver 40.

FIG. 1B is a diagram showing the driver's seat 31 in the manual control position. The position displacement device 13 sets the manual control position representing the seat position of the driver's seat 31 when the driver 40 drives the vehicle 10 under the manual control mode a in response to the operation of seat operation unit 4 by the driver 40.

The driver 40 sits on the driver's seat 31 at the manual control position to be operable with the steering wheel 32, the brake pedal 33 and the accelerator pedal 34.

The automatic control device 12 notifies the control transition demand requesting for transferring the primarily controller of the vehicle 10 from the automatic control device 12 to the driver 40 even when the operation of the vehicle 10 is under the automatic control mode, when it is determined that the vehicle 10 cannot be operated safely by the automated control. The automatic control device 12 carries out the transfer of the control of the vehicle 10 to the driver 40 within a predetermined control transition time (e.g., 10 seconds) from the time of generating the control transition demand.

The position displacement device 13 sets a recommendation range of the seat position of the driver's seat 31, capable of displacing the seat position to the manual control position representing the seat position when the driver 40 is operating the vehicle 10 manually within the control transition time, based on the manual control position.

The position displacement device 13 can displace the seat position of the driver's seat 31 from a seat position within the recommended range to the manual control position within the control transition time when the control transition demand is generated. Thus, the driver 40 can begin the manual control of the vehicle 10 in response to the control transition demand.

As shown in FIG. 2A, the position displacement device 13 sets the automatic control position representing the seat position of the driver's seat 31 under the automatic control mode to be included within the recommended range in response to the operation of the seat operation unit 4 by the driver 40. The position displacement device 13 may set the automatic control position according to each of the automated driving levels. The driver 40 can sit on the driver's seat 31 in a relaxed posture at the automatic control position.

As shown in FIG. 2B, the position displacement device 13 sets the intermediate position between the manual control position representing the seat position when the driver 40 is operating the vehicle 10 manually and the automatic control position representing the seat position when the vehicle 10 is controlled at a predetermined automatic driving level set within the recommendation range. The intermediate position of the seat position is within the recommended range. The driver's seat 31 at the intermediate position is located closer to the steering wheel 32, etc., than the automatic control position, and the posture of the driver's seat 31 is also in a condition more suitable for driving.

The position displacement device 13 displaces the driver's seat 31 from the manual control position to the automatic control position upon approval of the driver 40 when the automatic control mode has started.

The position displacement device 13 determines a level to which the driver 40 is contributing to driving based on information representing the body condition of the driver 40 obtained by the heart rate sensor 3, etc.

The position displacement device 13 displaces the seat position of the driver's seat 31 from the automatic control position to the intermediate position when the seat position is at the automatic control position and it is determined that the level to which the driver 40 is contributing to driving is equal to or below a predetermined reference threshold.

Additionally, the position displacement device 13 displaces the seat position of the driver's seat 31 to the manual control position when the control transition demand is requested to the driver 40 through the user interface 11, etc.

As described above, the position displacement device 13 of the present embodiment displaces the seat position of the driver's seat 31 from the automatic control position to the intermediate position when the level to which the driver 40 is contributing to driving is low. Further, when the control transition demand is generated, the position displacement device 13 can displace the seat position of the driver's seat 31 from the intermediate position within the recommended range to the manual control position operable by the manual control of the vehicle 10 in a short time. Thus, the driver 40 can begin the operation of the vehicle 10 with a margin.

Further, by the displacing seat position of the driver's seat 31 from the automatic control position to the intermediate position, the driver 40 is forced to be changed the driver's posture from a relaxed posture to a more driving-suitable posture, so that the position displacement device 13 can increase the level to which the driver 40 is contributing to driving. This allows the driver 40 to accurately drive the vehicle 10 because the level to which the driver 40 is contributing to driving is in a high level.

Figure 3:
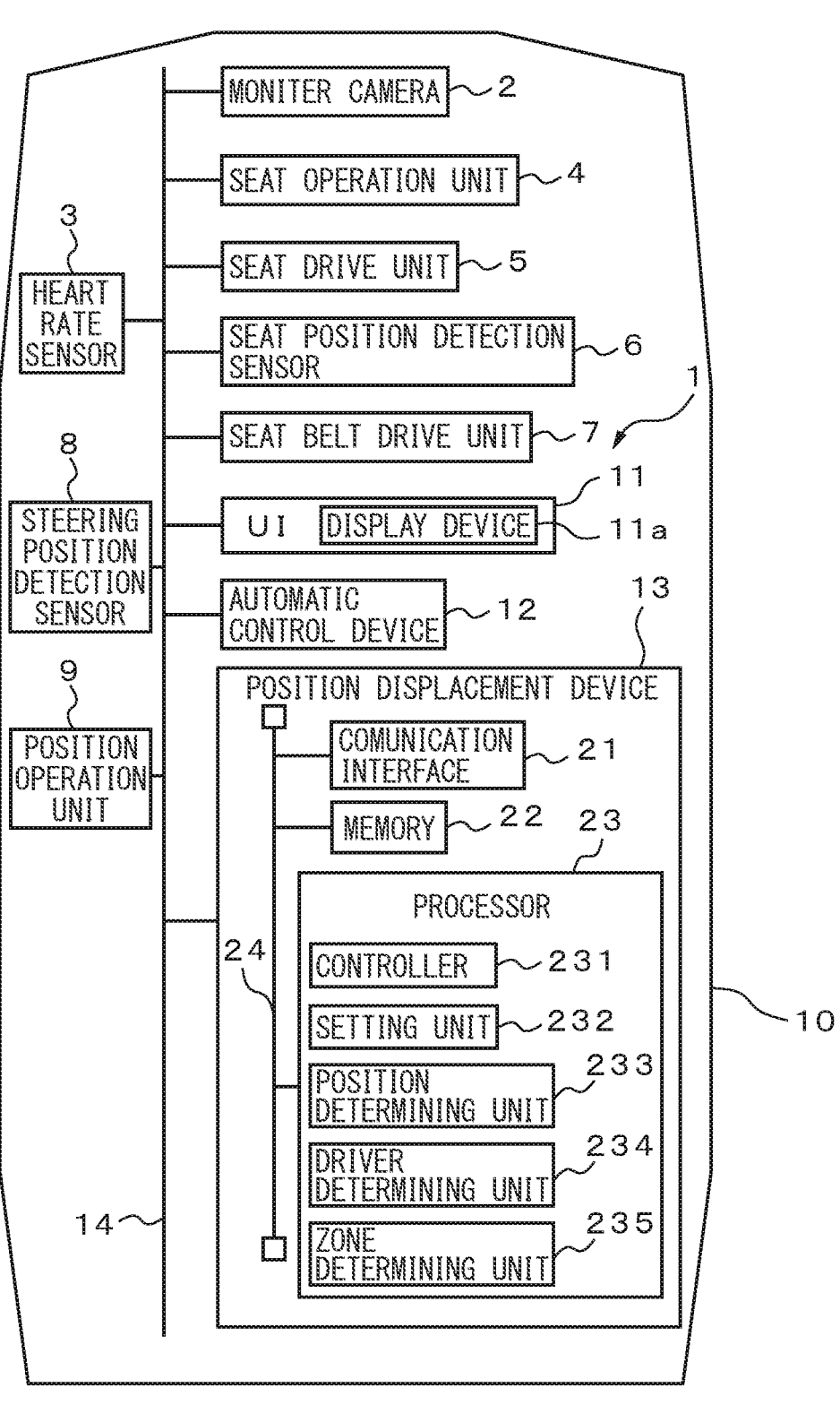
FIG. 3 is a general schematic drawing of a vehicle in which a position displacement system including the position displacement device of present embodiment is mounted.

FIG. 3 is a general schematic drawing of the vehicle 10 in which the position displacement system 1 including the position displacement device 13 of present embodiment. The position displacement-system 1 has a monitor camera 2, a heart rate sensor 3, a seat operation unit 4, a seat drive unit 5, a seat position detection sensor 6, a seat belt drive unit 7, a steering position detection sensor 8, a position operation unit 9, a user interface (UI) 11, the automatic control device 12, the position displacement device 13, etc.

The monitor camera 2, the heart rate sensor 3, the seat operation unit 4, the seat drive unit 5, the seat position detection sensor 6, the seat belt drive unit 7, the steering position detection sensor 8, the position operation unit 9, the UI 11, the automatic control device 12, and the position displacement device 13 are communicatively connected through an in-vehicle network 14 conforming to the Controller Area Network standard.

The monitor camera 2 is disposed within the cabin 30 to be capable of capturing monitor images including the face of the driver 40 driving the vehicle 10. The monitor camera 2 is an example of an imaging unit. The monitor camera 2, for example, at the monitoring image imaging time having a predetermined period, captures a monitoring image representing the periphery of the driver's seat 31. The monitor camera 2 has a 2D detector composed of an array of photoelectric conversion elements with infrared sensitivity, such as a CCD or C-MOS, and an imaging optical system that forms an image of the imaging region on the 2D detector. The monitor camera 2 preferably has a lighting device in addition to the 2D detector. The captured images are used, for example, when the manual control position is set by the position displacement device 13.

The heart rate sensor 3 detects the heart rate of the driver 40. The heart rate sensor 3 detects the heart rate of the driver 40 seated in the driver's seat 31 at the manual control position, the intermediate position or the automatic control position and outputs the heart rate of the driver 40 to the position displacement device 13. The heart rate sensor 3 measures the fine movement of the skin surface of the driver 40 using, for example, a millimeter-wave radar to detect the heart rate of the driver 40. As shown in FIG. 2A, the heart rate sensor 3 is preferably arranged to be capable of the millimeter-wave radiation even against the chest of the driver 40 seated in the driver's seat 31 in the automatic control position.

The driver's seat 31 has a seat back 31*a*, a seat cushion 31*b*, and a headrest 31*c*. The driver's seat 31 is an example of a member involved in the operation of the driver 40. As shown in FIG. 2A, the tilt angle of the seat back 31*a* is discretely displaceable in the ten levels. Each of the front-back direction and up-down direction positions of the seat cushion 31*b* is discretely displaceable in the ten levels. Each of the tilt and up-down direction position of the headrest 31*c* is discretely displaceable in the ten levels. In this specification, the seat position of the driver's seat 31 is meant to include tilt (tilt angle) and position of each part of the driver's seat 31.

The seat operation unit 4 is operated by the driver 40 to output an operating signal representing a position of the driver's seat 31 to be displaced to the position displacement device 13. The position displacement device 13 generates a driving signal for displacing the seat position of the driver's seat 31 based on the operating signal, and output the driving signal to the seat drive unit 5. The seat drive unit 5 displaces the driver's seat 31 based on the driving signal. The seat operation unit 4 has switches to operate each of the seat back 31*a*, seat cushion 31*b* and headrest 31*c*.

The seat drive unit 5 includes a drive device, such as a motor, for displacing the seat back 31*a*, seat cushion 31*b* or headrest 31*c*. In a FIG. 1B, etc., the seat drive unit 5 is arranged in the seat cushion 31*b*, but the seat drive unit may be arranged in a distributed manner on each of the seat back 31*a*, seat cushion 31*b* and headrest 31*c*.

The seat position detection sensor 6 detects the tilt or position of each part of the driver's seat 31. The seat position detection sensor 6 detects the tilt of the seat back 31*a* and outputs tilt information representing the tilt of the seat back 31*a* to the position displacement device 13. The seat position detection sensor 6 also detects the position of the front-back direction and the position of the up-down direction of the seat cushion 31*b*. The seat position detecting sensor 6 outputs position information representing the position of the front-back direction and the position of the up-down direction of the seat cushion 31*b* to the position displacement device 13. In addition, the seat position detection sensor 6 detects the tilt and up-down direction position of the headrest 31*c*. The seat position detecting sensor 6 outputs tilt information representing the tilt of headrest 31*c* and position information representing the position of the up-down direction of headrest 31*c* to the position displacement device 13.

The seat position detection sensor 6 may include a sensor that detects the tilt or position of seat back 31*a*, seat cushion 31*b* and headrest 31*c* mechanically, optically, or magnetically. In FIG. 1B, etc., the seat position detection sensor 6 is arranged in the seat cushion 31*b*. The seat position detection sensor 6 may be dispersed in each of the seat cushion 31*b* and headrest 31*c*.

The seat belt drive unit 7 is controlled by the position displacement device 13 to adjust the tension of the seat belt 35 worn by the driver 40 to a predetermined level. When the driver's seat 31 is at the automatic control position, the seat belt drive unit 7 is controlled by the position displacement device 13 to allow the driver 40 to loosen the tension of the seat belt 35 within a predetermined range.

The steering position detection sensor 8 detects the position of the steering wheel 32. The steering wheel 32 is an example of a member involved in the operation of the driver 40. As shown in FIG. 2A, each of the positions of the front-back direction and up-down direction of the steering wheel 32 is discretely displaceable in the ten levels. The steering position detection sensor 8 outputs position information representing of the positions of the front-back direction and up-down direction of the steering wheel 32 to the position displacement device 13 through the in-vehicle network 14. The steering position detection sensor 8 may include a sensor that detect the position of the steering wheel 32 mechanically, optically, or magnetically.

The position operation unit 9 is operated by the driver 40 and outputs a position operation signal representing the operation of the driver 40 to the position displacement device 13. When the seat position of the driver's seat 31 is other than the manual control position, the driver 40 can displace the driver's seat 31 to the manual control position by operating the position operation unit 9. The position displacement device 13 outputs a drive signal to the seat drive unit 5 for displacing the driver's seat 31 to the manual control position when inputting the position operating signal from the position operation unit 9.

The UI 11 is an example of a notification unit. The UI 11 is controlled by the automatic control device 12 or the position displacement device 13 to notify the driver 40 of information regarding the vehicle 10, such as the control transition demand. The UI 11 has a display device 11*a* such as a liquid crystal display or a touch panel to display the control transition demand, etc. The UI 11 may also include a sound-output device (not shown) for notifying the driver 40 of the control transition demand, etc. The UI 11 includes, for example, a touch panel or an operation button as an input device for inputting operation information from the driver 40 to the vehicles 10. The UI 11 outputs the input operating information to the automatic control device 12, etc., through the vehicle network 14.

The automatic control device 12 controls the operation of the vehicles 10. The automatic control device 12 has an automatic control mode for driving the vehicle 10 automatically and a manual control mode for controlling the operation of the vehicle 10 based on the operation of the driver 40. The automatic control device 12 drives the vehicles 10 under the automatic control mode. The automatic control device 12 controls the operation of steering, driving, braking, etc., under the automatic control mode based on the detection information, etc., of the sensors mounted on the vehicle 10 (not shown). When the automatic control device 12 begins the operation under the automatic control mode, the automatic control device 12 outputs information representing that the operation of automatic control mode is to be began to the position displacement device 13.

The automatic control device 12 controls the operation of the vehicle 10 such as a steering, driving, braking based on the manipulation of the driver under the manual control mode. The automatic control device 12 controls the operation of the vehicles 10 based on the operation of at least one of the steering wheel 32, the brake pedal 33, or the accelerator pedal 34 by the driver 40 under the manual control mode.

The automatic control device 12 may have a plurality of automated driving levels under the automatic control mode. In this specification, the plurality of the automatic operation levels may include the automatic operation level of the so-called levels 3 to 5. At the autonomous level 3, the automatic control device 12 corresponds to an autonomous driving device and the vehicle 10 corresponds to a conditional autonomous driving vehicle. At the autonomous operation level 4, the automatic control device 12 corresponds to an automatic operation device, and the vehicle 10 corresponds to an autonomous driving vehicle. At the autonomous level 5, the automatic control device 12 corresponds to an autonomous driving device and the vehicle 10 corresponds to a fully autonomous driving vehicle. Also, in this specification, the manual control mode may include the so-called level 0 to 2 autonomous driving level.

The automatic control device 12 outputs to the position displacement device 13, a location information representing the current location of the vehicle 10, a navigation route from the current location of the vehicle 10 to the destination location, a map information (high-precision map information) of a region (for example, a 100 m to 10 km square range) including the current location represented by the location information, speed of the vehicle 10, etc., at the output time having a predetermined period, and outputs.

The automatic control device 12 detects an object such as another vehicle around the vehicle 10 based on the detection information of the sensors (not shown) mounted on the vehicle 10. When it is impossible to maintain a predetermined distance or more between the vehicle 10 and other object under the automatic control mode, the automatic control device 12 notifies the driver 40 through UI 11 the control transition demand that requires to transfer the primarily controller of the vehicle 10 from the automatic control device 12 to the driver 40. In addition, under the automatic control mode, the automatic control device 12 notifies the driver 40 through UI 11 of the control transition demand requesting that the driving be transferred from the automatic control device 12 to the driver 40 before entering an area where the driving under the automated control mode is not allowed. Areas where operation under the automatic control mode is not allowed include area without high-precision map. Further, under the automatic control mode, the automatic control device 12 notifies the driver 40 through UI 11 of the control transition demand even when it is determined that the driving of the vehicle 10 cannot be safely controlled due to an error such as a sensor or the like. The automatic control device 12 also outputs the control transition demand to the position displacement device 13 through the in-vehicle network 14. Driving the vehicle 10 primarily controlled by the automatic control device 12 means that the automatic control device 12 controls the steering, driving, and braking operations without involving driver. Driving the vehicle 10 primarily controlled by the driver 40 means that the driver is involved in the control of at least one operation of steering, driving, and braking.

The automatic control device 12 carries out the transition of the control of the vehicle 10 to transfer the control to the driver 40 within a predetermined control transition time from the time of notifying the control transition demand to the driver 40. When the approval operation of the driver 40 to the control transition demand cannot be confirmed within the control transition time, the automatic control device 12 safely stops the vehicle 10 (Minimal Risk Maneuver process). The automatic control device 12, for example, transfers the control of the vehicle 10 to the driver 40 when recognizing any one of the following three driver's approval operation: (1) the driver 40 is holding the steering wheel 32 and operating the accelerator pedal 34, (2) the driver 40 is holding the steering wheel 32 and operating the brake pedal 33, and (3) the driver 40 is holding the steering wheel 32 and operating the steering wheel 32.

The position displacement device 13 displaces the seat position of the driver's seat 31 to the manual control position when the control transition demand is input from the automatic control device 12.

The position displacement device 13 carries out a control process, a setting process, a position determination process, a driver determination process, and a zone determination process. For this purpose, the position displacement device 13 has a communication interface (IF) 21, memory 22, and processor 23. The communication interface 21, the memory 22, and the processor 23 are connected through the signal wires 24. The communication interface 21 includes an interface circuitry for connecting the position displacement device 13 with the in-vehicle network 14.

The memory 22 is an example of a storage unit, and it has a volatile semiconductor memory and a non-volatile semiconductor memory, for example. The memory 22 stores application computer programs and various data to be used for information processing carried out by the processor 23.

All or some of the functions of the position displacement device 13 are functional modules implemented, for example, by a computer program executed by the processor 23. The processor 23 has a controller 231, a setting unit 232, a position determining unit 233, a driver determining unit 235, and a zone determining unit 236. Alternatively, the functional module of the processor 23 may be a dedicated arithmetic circuit provided in the processor 23. The processor 23 includes one or more CPUs (Central Processing Unit) and its peripheral circuitries. The processor 23 may further include other operational circuitry, such as a logic unit, a numerical unit, or a graphic processing unit. The position displacement device 13 is, for example, an electronic control unit (Electronic Control Unit: ECU). The detailed operation of the position displacement device 13 will be described later.

In FIG. 3, the automatic control device 12 and the position displacement device 13 are described as separate devices (e.g., Electronic Control Unit: ECU), but all of the devices may be configured as one device.

Figure 4:
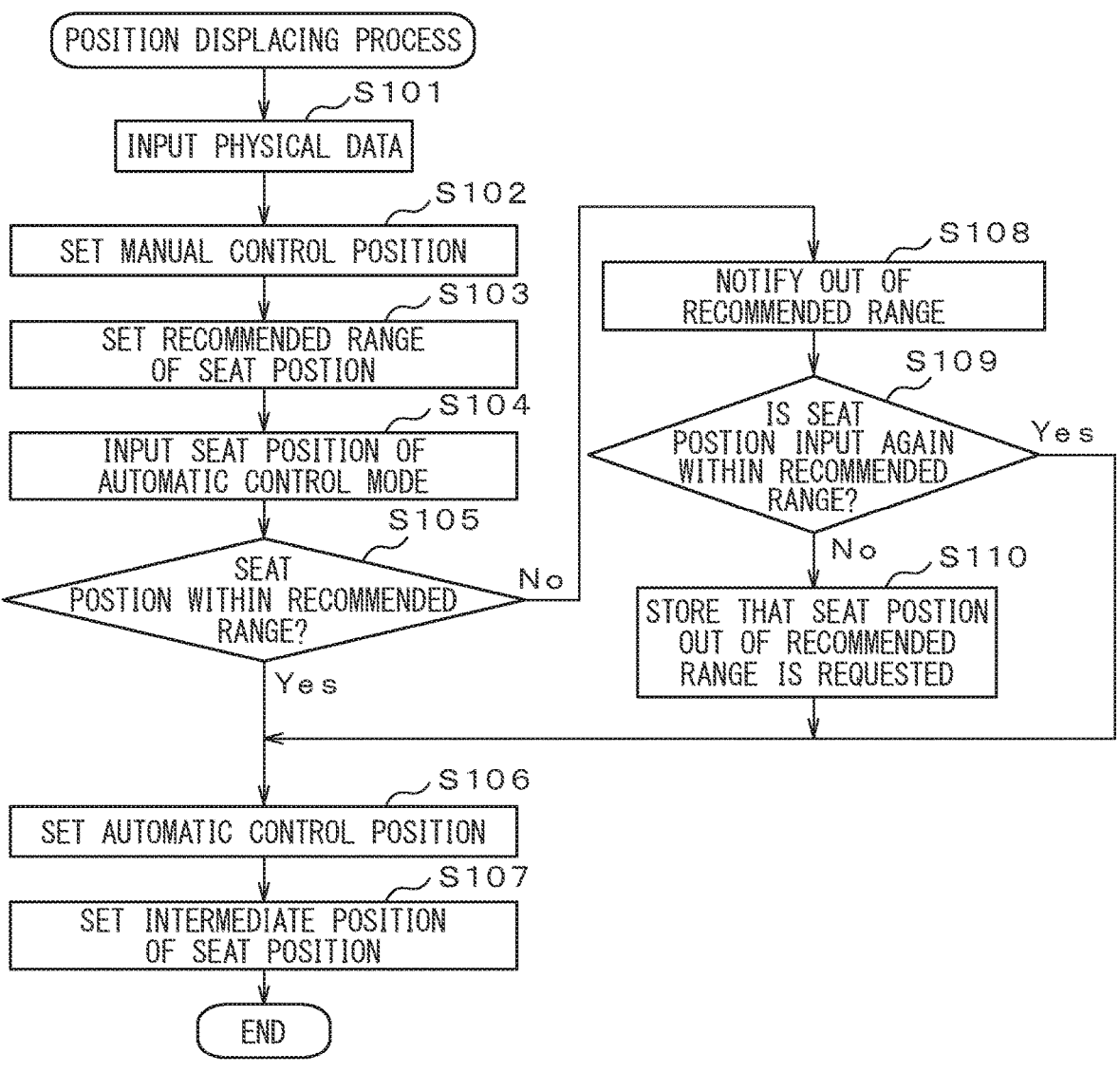
FIG. 4 is an example of an operation flow chart for the position setting process of the position displacement device of the present embodiment.

FIG. 4 is an example of an operation flow chart for the position setting process of the position displacement device 13 of the present embodiment. The position setting process shown in FIG. 4 is carried out each time the position displacement system 1 is activated.

First, the setting unit 232 inputs the physical data of the driver 40 through the UI 11 (step S101). For example, the height (mass) and weight can be used as physical data of the driver 40. The driver 40 inputs the height (mass) and weight by manipulating UI 11. The setting unit 232 may estimate the body data of the driver 40 Based on the images including the driver 40 captured by monitor camera 2.

Next, the setting unit 232 sets the manual control position of the steering wheel 32 and the driver's seat 31 at the time of the manual control mode (step S102). The driver 40 operates the steering wheel 32 to move the position each of the front-back direction and up-down direction to adjust the operating positions at the time of the manual control mode. The setting unit 232 may also set the manual control position of the brake pedal 33 and the accelerator pedal 34 at the time of the manual control mode. The driver 40 also operates the seat operation unit 4 to adjust the tilt of the seat back 31a. The driver 40 also operates the seat operation unit 4 to adjust the positions of the front-back direction and up-down direction of the seat cushion 31b. The driver 40 also operates the seat operation unit 4 to adjust the tilt and the position of the up-down direction of the headrest 31c.

The setting unit 232 receives position information detected by the steering position detection sensor 8 representing the positions of the front-back direction and up-down direction of the steering wheel 32. The setting unit 232 stores the positional information as the manual control position of the steering wheel 32 in the memory 22. Each of the positions of the front-back direction and up-down direction of the steering wheel 32 at the time of the manual control position is represented anyone of the ten levels. Thus, the setting unit 232 sets the manual control position of the steering wheel 32.

The setting unit 232 also inputs the tilt information representing the tilt of the seat back 31a, the position information representing the positions of the front-back direction and up-down direction of the seat cushion 31b and the tilt information and the position information representing the tilt and the position of the up-down direction of the headrest 31c, detected by the seat position detection sensor 6. The setting unit 232 stores these position and tilt information in the memory 22 as the manual control position of the driver's seat 31. The manual control position of the driver's seat 31 is represented by anyone of the ten levels of the tilt of the seat back 31a, the positions of the front-back direction and up-down direction of the seat cushion 31b and the tilt and the position of the up-down direction of the headrest 31c. Thus, the setting unit 232 sets the manual control position of the driver's seat 31.

The setting unit 232 notifies the driver 40 of information representing that the eye of the driver 40 cannot be identified through UI 11 when the eye of the driver 40 cannot be identified in the monitored image captured by the monitor camera 2 at the manual control position of the driver's seat 31. The driver 40 adjusts the manual control position of the driver's seat 31 so that the driver's eyes can be identified in the monitored images. Thus, the setting unit 232 sets the manual control position of the driver's seat 31 so that the eyes of the driver 40 can be identified in the monitored images. The automatic control device 12 estimates the level to which the driver 40 is contributing to driving when the driver's seat 31 is in the manual control position, based on the monitored images captured by the monitor camera 2. At this time, the automatic control device 12 can use the line of sight or the degree of eye opening based on the eyes of the driver 40 represented in the monitored images.

The setting unit 232 then sets the recommended range of the seat position of the driver's seat 31 (step S103). The setting unit 232 is an example of a recommendation range setting unit. The setting unit 232 sets the recommended range of the seat position so that the seat back 31a, seat cushion 31b and headrest 31c of the driver's seat 31 can be displaced within the control transition time from the automatic control position to the manual control position.

For example, the setting unit 232 determines a distance in which the driver's seat 31 and the driver 40 can be displaced to the manual control position within the control transition time, based on the weight (mass) of the driver 40, the mass of the driver's seat 31, and the driving force with which the seat drive unit 5 drives the driver's seat 31 (seat cushion 31b) in the front-back direction and the manual control position in order to set the recommended range of the position for the seat cushion 31b. The recommended range of the position of the front-back direction of the seat cushion 31b is expressed between the smallest value and the largest value among the ten levels.

The setting unit 232 may set the recommended range wider by a predetermined value when the height of the driver 40 is higher than the reference range and may also set the recommended range narrower by a predetermined value when the height of the driver 40 is lower than the reference range.

The setting unit 232 determines a tilt range in which the seat back 31a, headrest 31c and the driver 40 can be displaced to the manual control position within the control transition time, based on the weight (mass) of the driver 40, the mass of the seat back 31a and headrest 31c and the driving force with which the seat drive unit 5 drives the seat back 31a and headrest 31c in order to set the recommended range of the tilt for the seat back 31a. Here, when determining the tilt range, the setting unit 232 may use a half of the weight (mass) of the driver 40. The recommended range of the tilt for the seat back 31a is expressed between the smallest value and the largest value among the ten levels.

In addition, the setting unit 232 may set a recommended range for the position of the up-down direction of the seat cushion 31b and a recommended range for the tilt and the position of the up-down direction of the headrest 31c.

Next, the setting unit 232 inputs the seat position of the driver's seat 31 at the time of the automatic control mode (step S104). The driver 40 operates the seat operation unit 4 to adjust the tilt of the seat back 31a. The driver 40 also operates the seat operation unit 4 to adjust the position each of the front-back direction and up-down direction of the seat cushion 31b. The driver 40 further operates the seat operation unit 4 to adjust the tilt and the position of the up-down direction of the headrest 31c.

Next, the position determining unit 233 determines whether the input seat position of the driver's seat 31 is within the recommended range (step S105). The position determining unit 233 is an example of a third determining unit. The position determining unit 233 determines whether each of the position of the front-back direction of the seat cushion 31b and the tilt of seat back 31a is within the recommended range. The input tilt and position are set as the automatic control positions for the position of the up-down direction of the seat cushion 31b and the tilt and the position of the up-down direction of the headrest 31c since the recommended ranges have not been set for them.

When the seat position of the driver's seat 31 is within the recommended range (step S105—Yes), the setting unit 232 stores the input seat positions of the driver's seat 31 in the memories 22. The tilt or position of each part of the automatic control position of the driver's seat 31 is represented by anyone of the ten levels. Thus, the setting unit 232 sets the automatic control position of the driver's seat 31 (step S106).

Next, the setting unit 232 sets the intermediate position of the driver's seat 31 based on the manual control position and the automatic control position (step S107), and the series of processing steps is complete. Then, the controller 231 displaces the seat position of the driver's seat 31 to the manual control position using the seat drive unit 5. The setting unit 232 is an example of an intermediate position setting unit. The intermediate position is used to stimulate the driver 40 by displacing the seat position of the driver's seat 31 from the automatic control position to the intermediate position to increase the level to which the driver 40 is contributing to driving when the level to which the driver 40 is contributing to driving is low. The intermediate position of the driver's seat 31 is included in the recommended range. The intermediate position of the driver's seat 31 may not be at a middle position between the manual control position and the automatic control position. It is preferred that the intermediate position of the driver's seat 31 is between the manual control position and the automatic control position.

For example, the setting unit 232 sets the middle position of the manual control position and the automatic control position of the driver's seat 31 as the intermediate position of the driver's seat 31. Specifically, the setting unit 232 sets the middle of the tilt between the manual control position and the automatic control position as the intermediate position of the tilt of seat back 31*a* for the tilt of the seat back 31*a*. The setting unit 232 sets the middle position each of the front-back direction and up-down direction between the manual control position and the automatic control position as the intermediate position for the position each of the front-back direction and up-down direction of the seat cushion 31*b* for the position of the seat cushion 31*b*. The setting unit 232 sets the middle of the tilt and the middle position of the up-down direction between the manual control position and the automatic control position of the headrest 31*c* as the intermediate position of the tilt and the intermediate position of the up-down direction of the headrest 31*c* for the tilt and the position of the up-down direction of the headrest 31*c*. The tilt or position of each part of the intermediate position of the driver's seat 31 is represented by anyone of the ten levels.

The intermediate position of the driver's seat 31 may not be the middle between the manual control position and the automatic control position. For example, the intermediate position of the driver's seat 31 may be the manual control position side than the middle of the manual control position and the automatic control position. Further, the intermediate position of the driver's seat 31 may be the automatic control position side than the middle of the manual control position and the automatic control position.

On the other hand, when the seat position of the driver's seat 31 is not within the recommended range (step S105—No), the controller 231 notifies the driver that the input seat position is outside the recommended range (step S108). The controller 231 then notifies the drive 40 through UI 11 to input the seat position again within the recommended range. The controller 231 is an example of a notifying control unit.

Specifically, the controller 231 notifies the driver 40 through UI 11 that the position of the front-back direction of the seat cushion 31*b* is out of the recommended range when the position of the front-back direction is not included within the recommended range. The controller 231 may also notify the driver 40 by preventing the position of the front-back direction of the seat cushion 31*b* from being displaced out of the recommended range and thereby notifying the driver 40 that the position of the front-back direction of the seat cushion 31*b* is out of the recommended range when the driver 40 operates the seat operation unit 4 to do so.

The controller 231 notifies the driver 40 through UI 11 that the tilt of the seat back 31*a* is out of the recommended range when the tilt of the seat back 31*a* is not included within the recommended range. The controller 231 may also notify the driver by preventing the tilt of the seat back 31*a* from tilting out of the recommended range and thereby notifying the driver 40 that the tilt of seat back 31*a* is out of the recommended range when the driver 40 operates the seat operation unit 4 to do so.

The position determining unit 233 then determines whether the seat position input again by the driver 40 is within the recommended limits (step S109). When the seat position input again is within the recommended range (step S109—Yes), the process proceeds to steps S106 and S107 and the series of processing steps is complete.

On the other hand, when the seat position input again by the driver 40 is not included within the recommended range (step S109—No), the position determining unit 233 stores in the memory 22 that the seat position is not included within the recommended range has been requested by the driver 40 (step S110). Then, the process proceeds to steps S106 and S107, and the series of processing steps is complete. The automatic control position of the driver's seat 31 is set by prioritizing the request of the driver 40, but the fact that the automatic control position is not included within the recommended range has been requested is saved as a record.

In the above description, the automatic control device 12 has been described having one manual control mode (so-called automatic operation level 0), and one automatic control mode (so-called automatic operation level 3). When the automatic control mode has a plurality of automated driving levels, the automatic control position of the driver's seat 31 may be set to each of the plurality of automated driving levels. The same automatic control position may be set for a plurality of automated driving levels.

The setting unit 232 may carry out the automatic control position setting process according to the operation to the seat operation unit 4 by the driver 40 when the vehicle 10 is operated under the automatic control mode.

Figure 5:
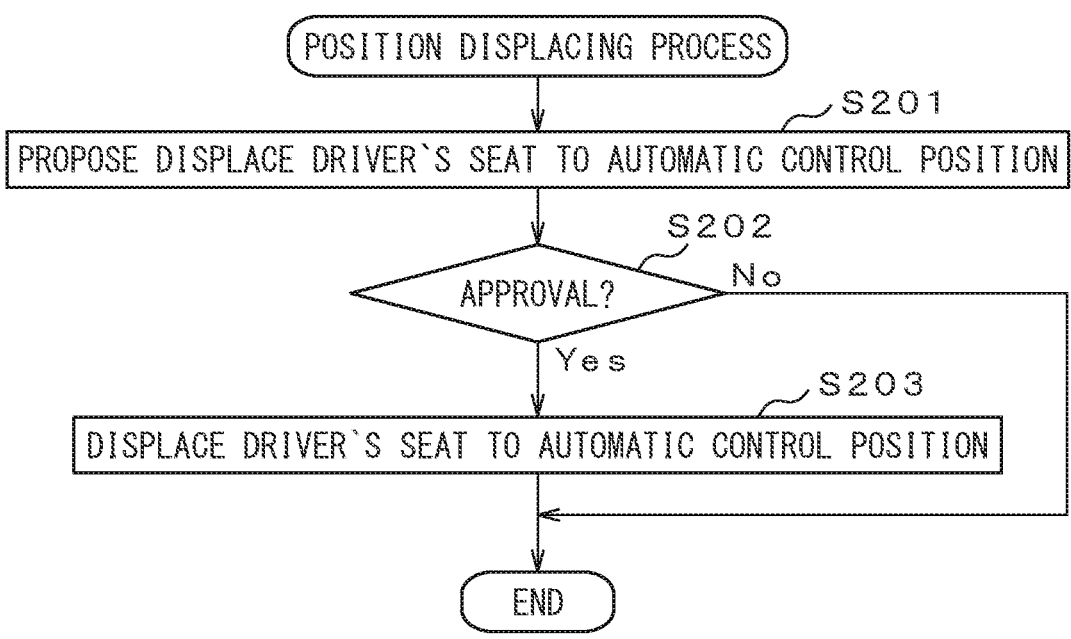
FIG. 5 is an example of an operation flow chart for the position displacing process of the position displacement device of the present embodiment (Part 1).

Next, referring to FIG. 5, the position displacing process of the driver's seat 31 from the manual control position to the automatic control position will be described below. FIG. 5 is an example of an operation flow chart for the position displacing process of the position displacement device 13 of the present embodiment. The position displacing process shown in FIG. 5 is carried out each time the position displacement device 13 obtains information indicating that the automatic control device 12 begins the operation under the automatic control mode.

First, the controller 231 proposes that the driver 40 through UI 11 that the seat position of the driver's seat 31 shall be displaced to the automatic control position (step S201).

The controller 231 then determines whether the driver 40 acknowledges the proposal that the driver's seat 31 is displaced to the automatic control position (step S202). The driver 40 operates UI 11 to input a response to the proposal to displace the seat position to the automatic control position.

When the driver 40 acknowledges the proposal that the seat position is displaced to the automatic control position (step S202—Yes), the controller 231 controls the seat drive unit 5 to displace the seat position of the driver's seat 31 from the manual control position to the automatic control position (step S203) and the series of processing steps is complete. The controller 231 controls the seat drive unit 5 to displace the seat back 31*a*, seat cushion 31*b* and the headrest 31*c* from the manual control position to the automatic control position. The controller 231 is an example of a seat position control unit. The controller 231 displaceably controls the seat position of the driver's seat 31 through the seat drive unit 5.

On the other hand, when the driver 40 do not accept the proposal to displace to the automatic control position (S202—No steps), the series of processing steps is complete. When the driver 40 do not acknowledge the proposal to displace the seat position to the automatic control position, the controller 231 may carry out the position displacement process shown in FIG. 5 at the proposal time having a predetermined period.

Figure 6:
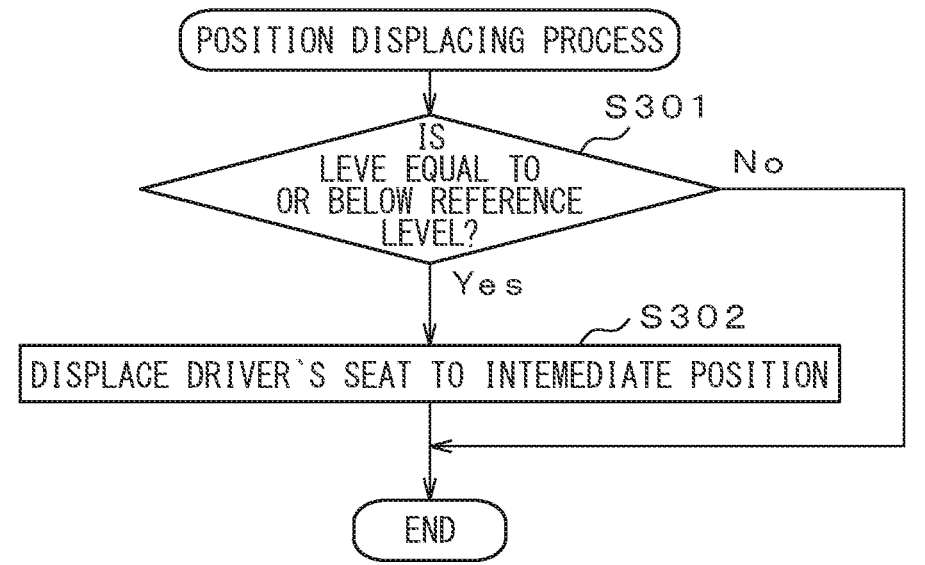
FIG. 6 is an example of an operation flow chart for the position displacing process of the position displacement device of the present embodiment (Part 2).

Next, referring to FIG. 6, the position displacing process for displacing the driver's seat 31 from the automatic control position to the intermediate position, will be described below. FIG. 6 is an example of an operation flow chart for the position displacing process of the position displacement device 13 of the present embodiment. The position displacing process shown in FIG. 6 is carried out at the driver determination time having a predetermined cycle when the seat position of the driver's seat 31 is at the automatic control position.

First, the driver determining unit 235 determines whether the level to which the driver 40 is contributing to driving is less than or equal to the reference thresholds (step S301). The driver determining unit 235 is an example of a determining unit. The driver determining unit 235 determines that the level to which the driver 40 is contributing to driving is above the reference threshold when the heart rate of the driver 40 input from the heart rate sensor 3 is within a predetermined reference range (step S301—No). The heart rate is an example of information representing the physical state of the driver 40. The physical state of the driver may include ecological information, facial expression, or behavior of the driver 40. On the other hand, when the heart rate of the driver 40 input from the heart rate sensor 3 is out of the reference range, the driver determining unit 235 determines that the level to which the driver 40 is contributing to driving is equal to or less than the reference threshold (step S301—Yes). When the heart rate of the driver 40 is lower than the reference range, the driver 40 may have drowsiness. Also, when the heart rate of the driver 40 is higher than the reference range, the driver 40 may have a physical condition problem.

When the level to which the driver 40 is contributing to driving is less than or equal to the reference threshold, the controller 231 controls the seat drive unit 5 to displace the seat position of the driver's seat 31 from the automatic control position to the intermediate position (step S302), and the series of processing steps is complete. The controller 231 controls the seat drive unit 5 to displace the seat back 31*a*, seat cushion 31*b* and the headrest 31*c* from the automatic control position to the intermediate position. When displacing the seat position of the driver's seat 31 from the automatic control position to the intermediate position, the controller 231 may use the UI 11 to output a musical sound or the like to impart a stimulus to the driver 40 to improve the level to which the driver 40 is contributing to driving. The controller 231 may control the seat drive unit 5 to vibrate the driver's seat 31 when displacing the seat position of the driver's seat 31 from the automatic control position to the intermediate position to impart a stimulus to the driver 40 to increase the level to which the driver 40 is contributing to driving. The UI 11 and the seat drive unit 5 are examples of a stimulating unit.

When the driver 40 had drowsiness, the driver's 31 seat position may be displaced from the automatic control position to the intermediate position to impart a stimulus to the driver 40 to remove the drowsiness.

In addition, when the driver 40 has a physical condition problem, the seat position of the driver's seat 31 is displaced from the automatic control position to the intermediate position, and the driver 40 further operates the position operation unit 9 to displace the driver's seat 31 to the manual control position to facilitate initiation of appropriate operations such as stopping the vehicle 10.

The driver determining unit 235 may use the second monitor camera 2*a* (see FIG. 2A) to monitor the state of the driver 40 when the driver's seat 31 is at the automatic control position to estimate the level to which the driver 40 is contributing to driving. For example, the driver determining unit 235 may detect the degree of opening of the eye (hereinafter, also referred to as the degree of eye opening) and the degree of opening of the mouth (hereinafter, also referred to as the degree of mouth opening) based on the monitored images captured using the second monitor camera 2*a*, and determine whether the level to which the driver is contributing to driving is below the predetermined reference threshold based on the detected degree of eye opening and the degree of mouth opening. For the classification of the eye and mouth of the driver 40 represented in the monitored image, a classifier trained to classify the eye and mouth from the image can be used.

The process shown in FIG. 6 may be carried out even when the seat position of the driver's seat 31 is out of the recommended range. When the level to which the driver 40 is contributing to driving is less than or equal to the reference threshold, the controller 231 controls the seat drive unit 5 to displace the seat position of the driver's seat 31 out of the recommended range to the intermediate position.

On the other hand, when the level to which the driver 40 is contributing to driving is above the reference thresholds (step S301—No), the series of processing steps is complete.

Figure 7:
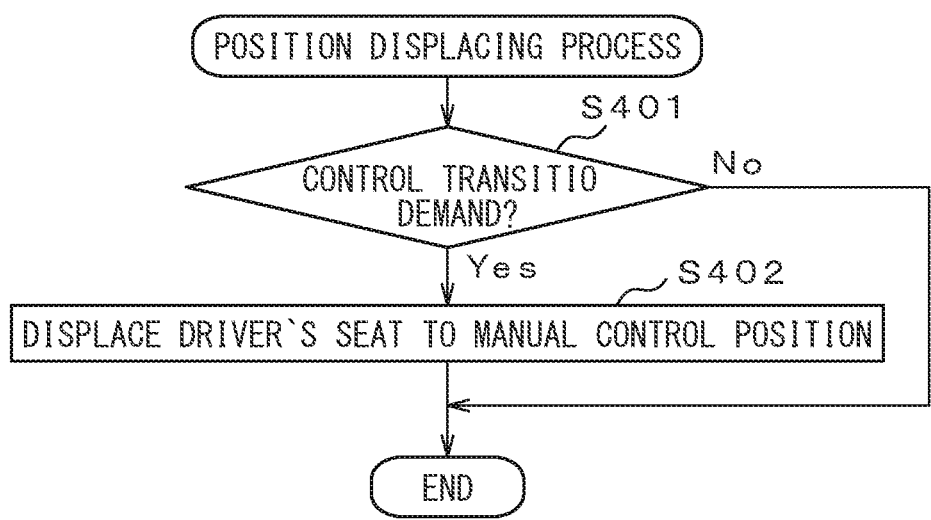
FIG. 7 is an example of an operation flow chart for the position displacing process of the position displacement device of the present embodiment (Part 3).

Next, referring to FIG. 7, the position displacing process for displacing the driver's seat 31 from the automatic control position to the manual control position, will be described below. FIG. 7 is an example of an operation flow chart for the position displacing process of the position displacement device 13 of the present embodiment. The position displacing process shown in FIG. 7 is carried out at a first control transition determination time having a predetermined period when the seat position of the driver's seat 31 is at the automatic control position or the intermediate position.

First, the controller 231 determines whether the control transition demand requesting the driver 40 to transfer the primarily controller from the automatic control device 12 to the driver 40 is input from the automatic control device 12 (step S401).

When the control transition demand has been input (step S401—Yes), the controller 231 controls the seat drive unit 5 to displace the seat position of the driver's seat 31 from the automatic control position or the intermediate position to the manual control position (step S402), and the series of processing steps is complete. The controller 231 controls the seat drive unit 5 to displace the seat back 31*a*, seat cushion 31*b* and the headrest 31*c* from the automatic control position or the intermediate position to the manual control position. The controller 231 also controls the seat belt drive unit 7 to adjust the tension of the seat belt 35 attached to the driver 40 to the predetermined level.

On the other hand, when the control transition demand is not input (step S401—No), the series of processing steps is complete.

When the control transition demand is input, the controller 231 can displace the driver's seat 31 from the automatic control position or the intermediate position within the recommended range to the manual control position within the control transition time. When the driver's seat 31 is displaced from the automatic control position to the manual control position, the level to which the driver 40 is contributing to driving is in a higher state from the beginning. Also, when the driver's seat 31 is displaced from the intermediate position to the manual control position, the level to which the driver 40 is contributing to driving has been improved in a higher from a lower state. This allows the driver 40 to begin the operation of the vehicle 10 because the driver 40 is in a high level to which the driver 40 is contributing to driving of the vehicle 10.

The process shown in FIG. 7 may be carried out even when the seat position of the driver's seat 31 is outside the recommended range. When the control transition demand has been input, the controller 231 controls the seat drive unit 5 to displace the seat position of the driver's seat 31 out of the recommended range to the manual control position.

Figure 8:
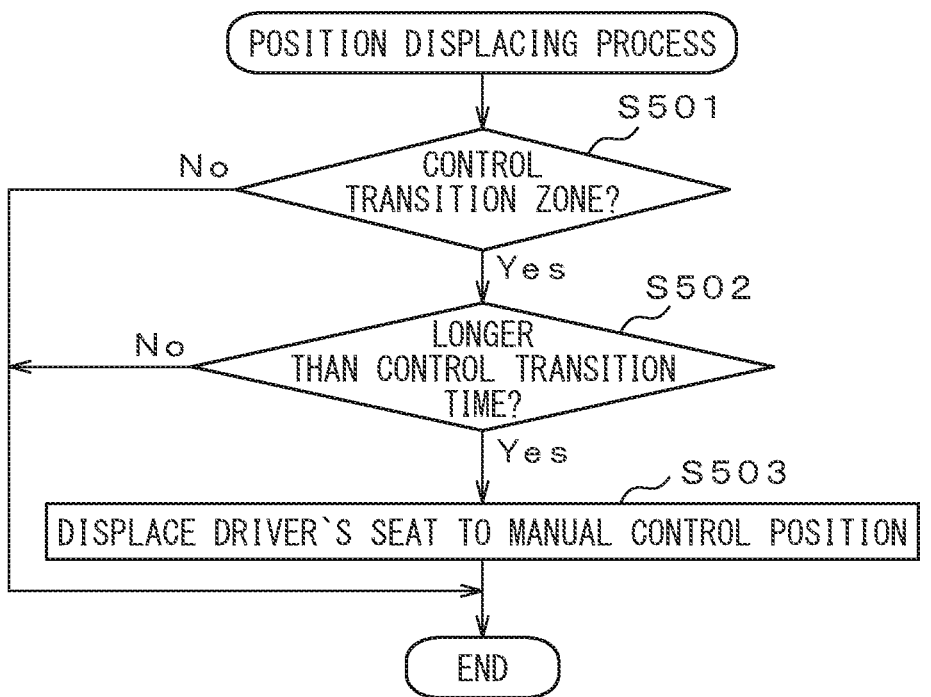
FIG. 8 is an example of an operation flow chart for the position displacing process of the position displacement device of the present embodiment (Part 4).

Next, referring to FIG. 8, the other position displacing process for displacing the driver's seat 31 from the automatic control position to the manual control position will be described below. FIG. 8 is an example of an operation flow chart for the position displacing process of the position displacement device 13 of the present embodiment. The position displacing process shown in FIG. 8 is carried out at the second control transition determination time having a predetermined period when the seat position of the driver's seat 31 is at the automatic control position or the intermediate position.

First, the zone determining unit 235 determines whether there exists a control transition zone where the primarily controller of driving of the vehicle 10 is transferred from the automated control device 12 to the driver 40 within a predetermined distance from a current location of the vehicle 10, based on the current location of the vehicle 10, a navigation route of the vehicle 10, and map information (step S501). The map information input from the automatic control device 12 contains the location information of the control transition zone. The zone determining unit 235 is an example of a second determining unit.

When there exists the control transition zone (step S501—Yes), the zone determining unit 235 determines whether it is estimated that the time required for the vehicles 10 to reach the control transition zone is longer than the control transition time (step S502). The zone determining unit 235 estimates how long it will take for the vehicle 10 to reach the control transition zone based on the latest mean velocity of the vehicle 10 and the distance between the current location of the vehicle 10 and the control transition zone.

When the time taken by the vehicle 10 to the reach control transition zone is longer than the control transition time (step S502—Yes), the controller 231 controls the seat drive unit 5 to displace the seat position of the driver's seat 31 from its current position (the automatic control position or the intermediate position) to the manual control position over a time longer than the control transition time. The controller 231 controls the seat drive unit 5 to displace the seat back 31*a*, seat cushion 31*b* and the headrest 31*c* from the automatic control position or the intermediate position to the manual control position. It is necessary that the seat position of the driver's seat 31 has been displaced to the manual control position until the vehicle 10 reaches the control transition zone, but the slower the displacement velocity is, the more comfortable for the driver 40. When the seat position of the driver's seat 31 is at the automatic control position, the controller 231 may displace the seat position of the driver's seat 31 from the automatic control position to the intermediate position and stop the displacement of the seat 31 once, and then displace the seat 31 to the manual control position after stopping.

On the other hand, when there is no control transition zone (step S501—No), or when the time required for the vehicles 10 to reach the control transition zone is no longer than the control transition time (step S502—No), the series of process steps is complete.

Once it is determined that there exists the control transition zone, the position displacing process shown in FIG. 8 is stopped until the vehicle 10 passes through this control transition zone.

As described above, the position displacement device of the present embodiment displaces the seat position of the driver's seat from the automatic control position to the intermediate position when the level to which the driver is contributing to driving is low. Further, when the control transition demand is generated, the position displacement device can displace the seat position of the driver's seat from the intermediate position within the recommended range to the manual control position operable by the manual control of the vehicle in a short time. Thus, the driver can begin the operation of the vehicle with a margin. Since the intermediate position is closer to the automatic control position than the manual control position, the time required for the driver's seat to be displaced from the intermediate position to the manual control position is shorter than the time required for the driver's seat to be displaced from the automatic control position to the manual control position. After the driver's seat position has been displaced to the manual control position, it is necessary for the driver to begin the operation of the vehicle with an approved action for the control transition demand. Therefore, the driver can begin the driving of the vehicle with a margin (time to spare) since the position displacement device displaces the seat position from the automatic control position to the intermediate position in advance when the level to which the driver is contributing to driving is low.

Also, by displacing the driver's seat position from the automatic control position to the intermediate position, the position displacement device can increase the level to which the driver is contributing to driving because the posture of the driver's seat changes from a relaxed posture to a more suitable posture for driving. This allows the driver to accurately drive the vehicle because the driver is in a high level to which the driver is contributing to driving.

The position displacement device, computer program for position displacement and position displacement method according to the embodiments described in the present disclosure may incorporate appropriate modifications that still fall within the gist of the disclosure. Moreover, the technical scope of the disclosure is not limited to these embodiments and includes the invention and its equivalents as laid out in the claims.

For example, the position displacement system may have an operation part drive unit for displacing the position of the operating part such as the steering wheel. The controller may displaceably control the position of the operation part with which the driver controls the operation of the vehicle manually. Then, the setting unit may set a recommended range of the position of the operating part within a range in which the control unit can displace the position of the operating part to the manual control position within a predetermined time. The controller may determine whether the position of the operating part requested by the driver is included within the recommended range of the position of the operating part. The controller may notify that the position of the operating part requested by the driver is not included within the recommended range when the position of the operating part requested by the driver is not included within the recommended range. The controller may displace the position of the operating part to the manual control position when the driver is requested to transfer the primarily controller of driving of the vehicle from the automatic control device to the driver.

The invention claimed is:

1. A position displacing device comprising:
a processor programmed to:
    control displaceably a seat position of a seat on which a driver is seated;
    set a recommendation range of the seat position, capable of displacing the seat position to a manual control position representing the seat position in response to the driver operating a vehicle manually within a predetermined time, based on the manual control position;

set an intermediate position between the manual control position and an automatic control position representing the seat position in response to the vehicle being controlled at a predetermined automatic driving level set within the recommendation range;

receive data including a detected physical condition of the driver; and based on the received data, compare a level to which the driver is contributing to driving to a predetermined reference threshold, wherein in response to a determined level that is equal to or below the reference threshold, displace the seat position from the automatic control position to the intermediate position, and the intermediate position is located closer to a steering wheel than the automatic control position is.

2. The position displacement device according to claim 1, wherein the processor is further programmed to displace the seat position to the manual control position in response to a request to transfer primary control of driving of the vehicle from an automatic control device to the driver.

3. The position displacement device according to claim 1, wherein the processor is further programmed to:

determine whether there exists a control transition zone where a primarily controller of driving of the vehicle is transferred from an automated control device to the driver within a predetermined distance from a current location of the vehicle, based on the current location of the vehicle, a navigation route of the vehicle, and map information; and displace the seat position from the current position to the manual control position over a time longer than the predetermined time when the control transition zone exists and the seat position is at the automatic control position and time taken for the vehicle to reach the control transition zone is estimated to be longer than the predetermined time.

4. The position displacement device according to claim 1, wherein the processor is further programmed to:

determine whether the seat position requested by the driver is included in the recommendation range;

notify the driver through a notification unit that the seat position requested by the driver is not included in the recommendation range when the seat position requested by the driver is not included in the recommendation range; and store in a storage unit that the seat position not included in the recommendation range was requested and set the seat position not included in the recommendation range as the automatic control position, when it is determined that the seat position not included in the recommendation range is requested again by the driver after the driver was notified through the notification unit that the seat position requested by the driver is not included in the recommendation range.

5. The position displacement device according to claim 1, wherein the processor is further programmed to impart a stimulus to the driver through a stimulating unit to improve the level to which the driver is contributing to driving when displacing the seat position from the automatic control position to the intermediate position.

6. The position displacement device according to claim 1, wherein the intermediate position is set based upon a predetermined control transition time from the automatic control position to the manual control position.

7. A computer-readable, non-transitory storage medium storing a computer program for displacing position, which causes a processor to execute a process, and the process comprising:

controlling displaceably a seat position of a seat on which a driver is seated;

setting a recommendation range of the seat position, capable of displacing the seat position to a manual control position representing the seat position in response to the driver operating a vehicle manually within a predetermined time, based on the manual control position;

setting an intermediate position between the manual control position and an automatic control position representing the seat position in response to the vehicle being controlled at a predetermined automatic driving level set within the recommendation range;

receiving data including a detected physical condition of the driver; and based on the received data, comparing a level to which the driver is contributing to driving to a predetermined reference threshold, wherein in response to a determined level that is equal to or below the reference threshold, displacing the seat position from the automatic control position to the intermediate position, and the intermediate position is located closer to a steering wheel than the automatic control position is.

8. A method for displacing position carried out by a position displacement device, and the method comprising:

controlling displaceably a seat position of a seat on which a driver is seated;

setting a recommendation range of the seat position, capable of displacing the seat position to a manual control position representing the seat position in response to the driver operating a vehicle manually within a predetermined time, based on the manual control position;

setting an intermediate position between the manual control position and an automatic control position representing the seat position in response to the vehicle being controlled at a predetermined automatic driving level set within the recommendation range;

receiving data including a detected physical condition of the driver; and based on the received data, comparing a level to which the driver is contributing to driving to a predetermined reference threshold, wherein in response to a determined level that is equal to or below the reference threshold, displacing the seat position from the automatic control position to the intermediate position, and the intermediate position is located closer to a steering wheel than the automatic control position is.

* * * * *